US012783629B2

(12) United States Patent
Soundrapandian et al.

(10) Patent No.: US 12,783,629 B2
(45) Date of Patent: Nov. 3, 2026

(54) GENERATING POLICY COMPLIANT CAPTCHA

(71) Applicant: Zoho Corporation Private Limited, Chengalpattu Taluk (IN)

(72) Inventors: Pradeep Kumar Duraisamy Soundrapandian, Sivakasi (IN); Punithavathi Palani, Chennai (IN)

(73) Assignee: Zoho Corporation Private Limited, Chengalpattu Taluk (IN)

(*) Notice: Subject to any disclaimer, the term of this patent is extended or adjusted under 35 U.S.C. 154(b) by 0 days.

(21) Appl. No.: 18/885,094

(22) Filed: Sep. 13, 2024

(65) Prior Publication Data

US 2025/0086264 A1 Mar. 13, 2025

Related U.S. Application Data

(60) Provisional application No. 63/597,925, filed on Nov. 10, 2023.

(30) Foreign Application Priority Data

Sep. 13, 2023 (IN) ............................ 202341061706

(51) Int. Cl.

*G06F 21/36* (2013.01)
*G06F 21/31* (2013.01)
*G06F 40/20* (2020.01)
*G06T 11/00* (2026.01)
*H04L 9/40* (2022.01)

(52) U.S. Cl.

CPC .............. *G06F 21/36* (2013.01); *G06F 40/20* (2020.01); *G06T 11/00* (2013.01); *G06F 21/31* (2013.01); *G06F 2221/2133* (2013.01); *H04L 63/20* (2013.01)

(58) Field of Classification Search

CPC .......... G06F 21/31; G06F 21/36; G06F 40/20; G06F 2221/2133; G06T 11/00; H04L 63/20

See application file for complete search history.

(56) References Cited

U.S. PATENT DOCUMENTS

2021/0081719 A1* 3/2021 Banerjee .............. H04N 21/854
2024/0273177 A1* 8/2024 Chitragar ................ G06F 21/36
2024/0295953 A1* 9/2024 Zakharov ............ G06F 3/04845
(Continued)

OTHER PUBLICATIONS

Jia, X., Xiao, J. & Wu, C. TICS: text-image-based semantic CAPTCHA synthesis via multi-condition adversarial learning. Visual Computer 38, 963-975 (2022). https://doi.org/10.1007/s00371-021-02061-1 (Year: 2022).*

(Continued)

*Primary Examiner* — Robert B Leung
(74) *Attorney, Agent, or Firm* — AHMANN KLOKE LLP

(57) ABSTRACT

Disclosed is a system and method to generate policy compliant CAPTCHA images to be rendered on a CAPTCHA question using an image composer, which takes a policy compliant sentence generated by a sentence composer. The policy considered to validate the CAPTCHA is one or combination of privacy policy, client-specific configuration like GDPR, HIPAA, etc. The CAPTCHA images are generated by the image composer based on the sentence generated by the sentence composer and structured knowledge graph.

20 Claims, 18 Drawing Sheets

(56) References Cited

U.S. PATENT DOCUMENTS

| | | | | |
|---|---|---|---|---|
| 2024/0296315 | A1* | 9/2024 | Singh | G06F 16/3325 |
| 2024/0320310 | A1* | 9/2024 | Callegari | H04L 63/10 |
| 2024/0378394 | A1* | 11/2024 | Kotikalapudi | G06F 40/40 |
| 2025/0077795 | A1* | 3/2025 | Krabach | G06F 16/35 |
| 2025/0124022 | A1* | 4/2025 | Ghosh | G06F 16/2428 |
| 2025/0131187 | A1* | 4/2025 | Cuomo | G06F 16/243 |

OTHER PUBLICATIONS

Babaei, M. et al., "YAPPTCHA: Yet Another Picture Promoted CAPTCHA with Spam Stopping, Image Labeling and SIFT Accomplishment," 21st Iranian Conference on Electrical Engineering (ICEE), May 2013.

Yuan, Lin et al., "Context-Dependent Privacy-Aware Photo Sharing Based on Machine Learning," IFIP International Conference on ICT Systems Security and Privacy Protection, pp. 93-107, May 2017.

Zhu, Bin B. et al., "Attacks and Design of Image Recognition CAPTCHAs," Proceedings of the 17th ACM Conference on Computer and Communications Security, pp. 187-200, Oct. 2010.

* cited by examiner

1300

1500

1700

GENERATING POLICY COMPLIANT CAPTCHA

CROSS-REFERENCE TO RELATED APPLICATIONS

The present application claims priority to Indian Provisional Patent Application No. 202341061706 filed Sep. 13, 2023 and U.S. Provisional Patent Application Ser. No. 63/597,925 filed Nov. 10, 2023, each of which is incorporated by reference herein.

BACKGROUND

CAPTCHAs typically present users with challenges that are easy for humans to solve but hard for an automated scripts to decipher. These challenges often involve distorted or manipulated text, images, or puzzles that require human-like reasoning to solve. For example, a common CAPTCHA might show a distorted sequence of letters and numbers and ask the user to type them into a text box. Other variations might require users to identify objects in images, solve simple math problems, or perform other tasks that are relatively easy for humans but challenging for bots.

DETAILED DESCRIPTION

Authentication is one of the common techniques used in software applications to prevent sensitive services and web resources from getting accessed by a malicious users or bot. Due to the advancement in the technological space, there is an increasing demand for security of online data. In this research, we investigate a way to generate CAPTCHA using a combination of three broad domains like: Large Language Model (LLM), Text-to-Image generation Artificial Intelligence (AI) models, and Neural Style Transfer (NST). The goal of this research is to generate a secure dynamically and personalized image CAPTCHA from Text rather than from some existing dataset of images or annotated images.

CAPTCHA, which stands for "Completely Automated Public Turing test to tell Computers and Humans Apart," is a security mechanism designed to differentiate between human users and automated bots on the internet. CAPTCHAs typically present users with challenges that are easy for humans to solve but hard for automated scripts to decipher. These challenges often involve distorted or manipulated text, images, or puzzles that require human-like reasoning to solve. For example, a common CAPTCHA might show a distorted sequence of letters and numbers and ask the user to type them into a text box. Other variations might require users to identify objects in images, solve simple math problems, or perform other tasks that are relatively easy for humans but challenging for bots. Some reasons for using CAPTCHA are preventing bots, security, fraud prevention, data integrity, spam prevention, and AI training, to name several.

Figure 1:
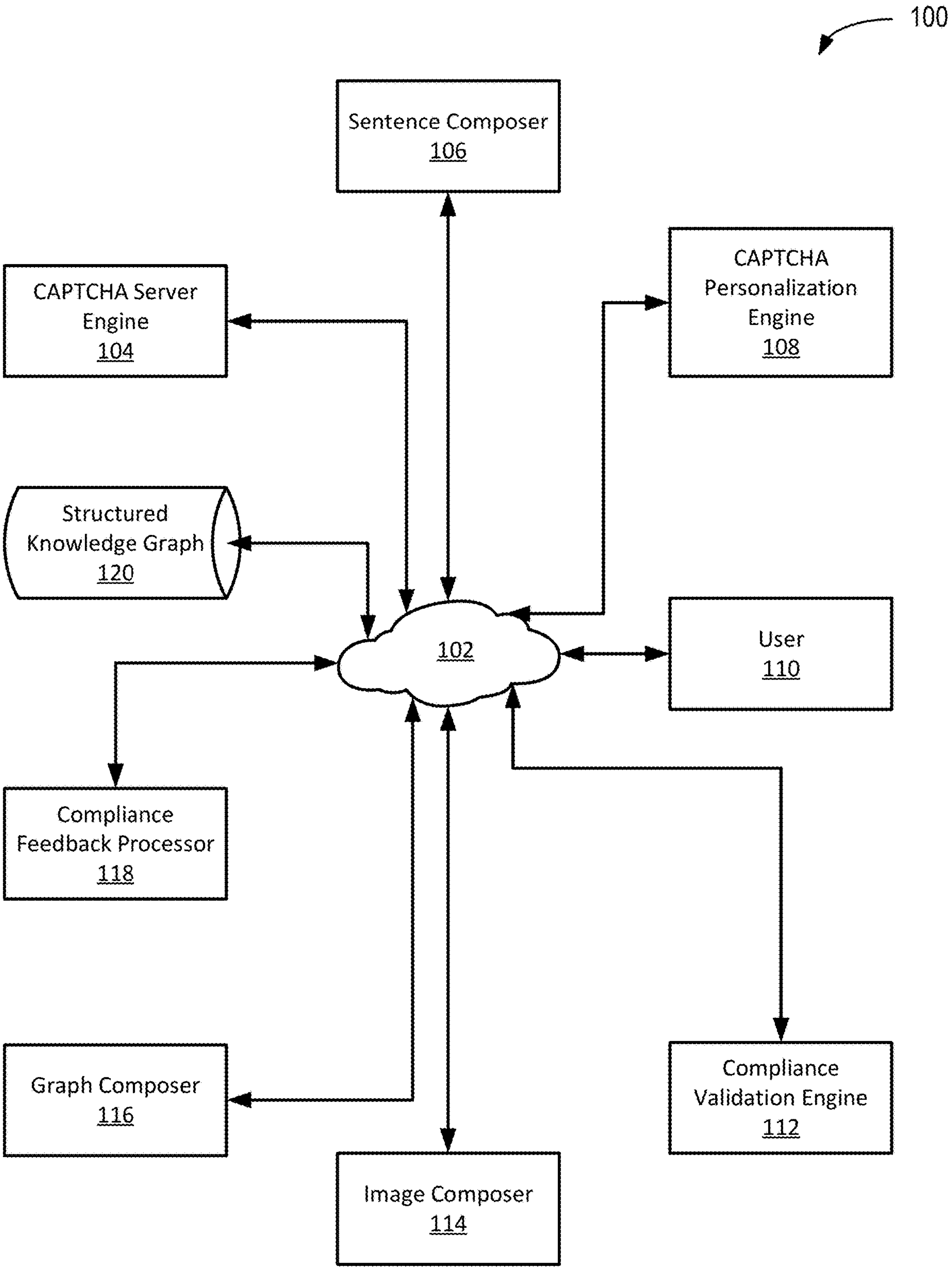
FIG. 1 depicts an example of an overall architecture of policy compliant Completely Automated Public Turing test to tell Computers and Humans Apart (CAPTCHA) generation system.

The policy compliant CAPTCHA generation system shown in FIG. 1 includes a network 102, CAPTCHA server engine 104, sentence composer 106, CAPTCHA personalization engine 108, user 110, compliance validation engine 112, image composer 114, graph composer 116, compliance feedback processor 118, and a structured knowledge graph 120.

The system described in association with FIG. 1, and other descriptions in this paper, makes use of a network to couple components of the system (e.g., the network 102). The network and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The network and other computer readable mediums discussed in this paper are intended to represent a variety of potentially applicable technologies. For example, the network can be used to form a network or part of a network. Where two components are co-located on a device, the network can include a bus or other data conduit or plane. Where a first component is co-located on one device and a second component is located on a different device, the network can include or encompass a relevant portion of a wireless or wired back-end network or Local Area Network (LAN). The network can also encompass a relevant portion of a Wide Area Network (WAN) or other network, if applicable.

The devices, systems, and computer-readable mediums described in this paper can be implemented as a computer system or parts of a computer system or a plurality of computer systems. As used in this paper, a server is a device or a collection of devices. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g., "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor that is a component of the engine. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

A database management system (DBMS) can be used to manage a datastore. In such a case, the DBMS may be thought of as part of the datastore, as part of a server, and/or as a separate system. A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the repositories described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations, while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

The system stores its knowledge in a "CAPTCHA datastore" as the structured knowledge graph 120. Engines and datastore modules can be present in a monolithic system (as a single application) or can be designed as microservices deployed on the cloud (as illustrated in FIG. 1).

The CAPTCHA server engine 104 is intended to represent an engine responsible for providing (e.g., delivering, rendering, or the like) CAPTCHA to an endpoint (e.g., web page). The CAPTCHA server engine is configured to receive a CAPTCHA answer entered by the user 110 solving the CAPTCHA on the endpoint. It compares the answer from the endpoint with an answer stored in CAPTCHA datastore. If the user answers correctly, permission to access to a website, application, or other resource is granted to the user. If the user answers incorrectly, a new CAPTCHA from the CAPTCHA datastore may or may not be rendered on the endpoint, depending upon implementation-, configuration-, or context-specific factors.

Figure 2:
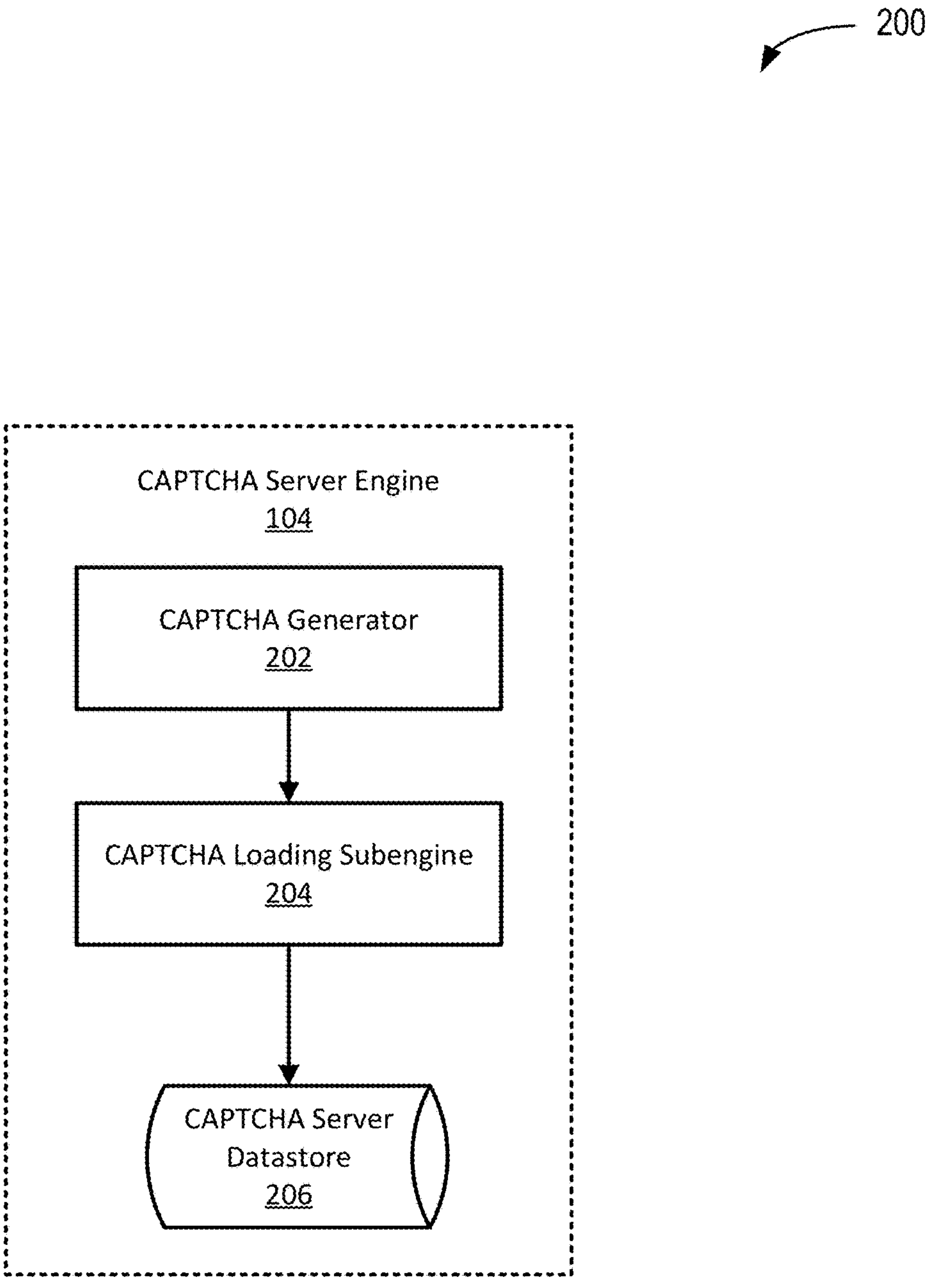
FIG. 2 depicts an example of a CAPTCHA server engine.

FIG. 2 depicts an example of a CAPTCHA server engine, such as the CAPTCHA server engine 104 of FIG. 1. In the example of FIG. 2, the CAPTCHA server engine 104 includes a CAPTCHA generator subengine 202, a CAPTCHA loading subengine 204, and a CAPTCHA server datastore 206.

Figure 3:
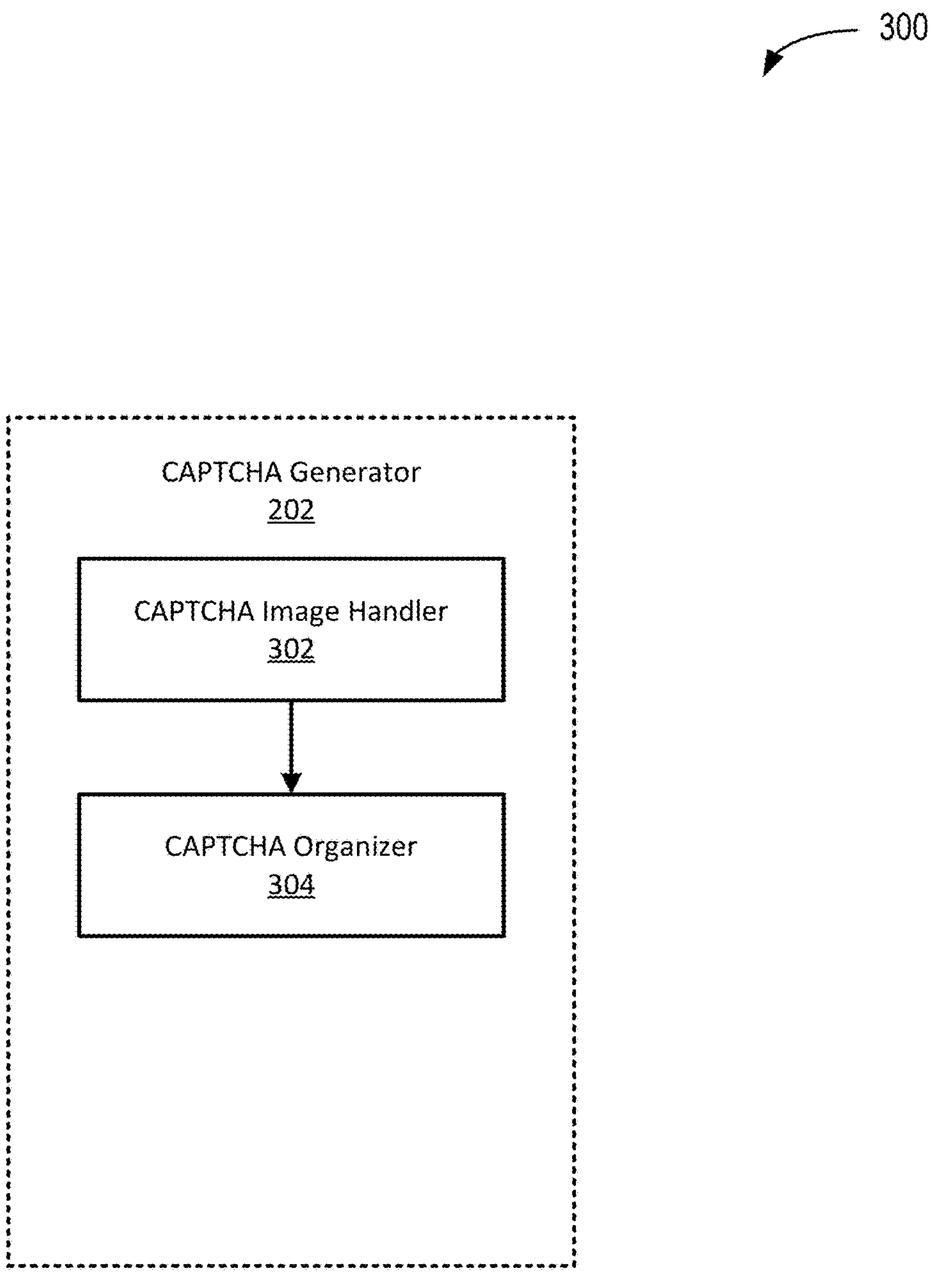
FIG. 3 depicts an example of a CAPTCHA generator engine.

FIG. 3 depicts an example of a CAPTCHA generator engine, such as the CAPTCHA generator engine 202 of FIG. 2. In the example of FIG. 3, the CAPTCHA generator 202 includes a CAPTCHA image handler 302 and a CAPTCHA organizer 304. In a specific implementation, the CAPTCHA image handler 302 analyzes the template provided by the CAPTCHA selection unit to determine the total number of sentence(s) and images required to fill the template. In a specific implementation, CAPTCHA properties are defined based on template type. For example, multi-choice diffusion image CAPTCHA may require 3×3 (i.e., 9) images along with 9 valid, GDPR complaint questions mapped to the images that are generated The CAPTCHA image handler invokes a sentence composer, such as the sentence composer 106 of FIG. 1, and an image composer, such as the image composer 114 of FIG. 1, to provide one or more policy complaint CAPTCHA images; the number of images provided is implementation-, configuration-, or context-specific. It uses the CAPTCHA images to form a CAPTCHA as selected by an admin (e.g., a human or artificial agent) through a CAPTCHA selection engine of a CAPTCHA Personalization Engine (CAPE), such as the CAPE 108 of FIG. 1, described in more detail below. In a specific implementation, the CAPTCHA organizer 304 includes a template that corresponds to the type of CAPTCHA selected; it lays the images and question together on the template to form a CAPTCHA.

Figure 4:
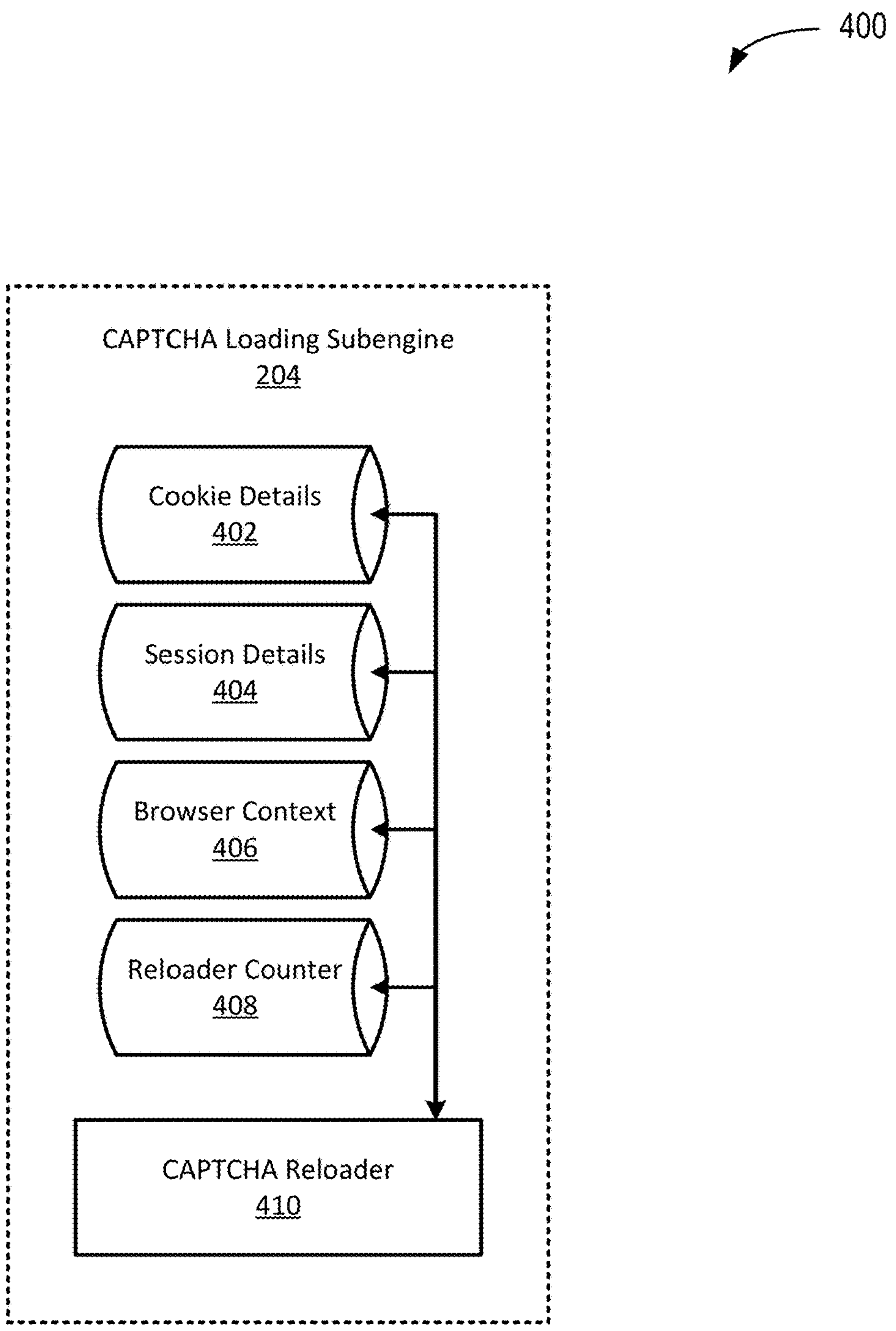
FIG. 4 depicts an example of a CAPTCHA loading engine.

FIG. 4 depicts an example of a CAPTCHA loading subengine, such as the CAPTCHA loading subengine 204 of FIG. 2. In a specific implementation, the CAPTCHA Loading unit keeps track of details and context to provide loading and reloading functionality. In the example of FIG. 4, the CAPTCHA loading subengine 204 includes a cookie details datastore 402, a session details datastore 404, a browser context datastore 406, a reloader counter datastore 408, and a CAPTCHA reloader 410.

The CAPTCHA reloader 410 represents an engine that understands a user-level dynamically and adjusts the level of difficulty according to the user. For example, if the user was not able to identify the CAPTCHA for more than a specific number of attempts, then the CAPTCHA's difficulty level can be decreased by reducing the number of layers in an NST model. Also, if a user is not able to perform well in Image-Identification CAPTCHA, CAPTCHA reloader can provide other CAPTCHAs like Puzzle or Option-based or Slider CAPTCHAs so the user can more readily identify them.

In a specific implementation, the CAPTCHA reloader accesses cookie details, session details, browser context, and a reloader counter that play a part in managing user interactions and states in a web application. This unit is responsible for maintaining and restoring the state of a user's session across multiple requests and page loads.

The cookie details datastore 402 includes data about cookies, which are small pieces of data sent from a website and stored on the user's device by their web browser. The cookie details datastore may or may not simply save cookies in the datastore; it may or may not include more data than the cookie alone. They are used to store information about the user and their interactions with the site. In a specific implementation, the CAPTCHA reloader handles the following cookie details:

Name-Value Pairs: Each cookie is composed of a name and a value, which can store various types of information such as user preferences, authentication tokens, and tracking data.

Expiration Date: Determines how long the cookie should be stored on the user's device. Cookies can be session-based (deleted when the browser is closed) or persistent (stored until the expiration date is reached).

Domain and Path: Specifies the domain and path for which the cookie is valid. This ensures that cookies are sent only to specific parts of the site.

Secure and HttpOnly Flags: The secure flag ensures that the cookie is only sent over HTTPS, and the HttpOnly flag makes the cookie inaccessible to JavaScript, enhancing security.

The session details datastore 404 includes data maintained on the server side to keep track of a user's interaction with the web application across multiple requests. In a specific implementation, the CAPTCHA reloader handles the following session details:

Session ID: A unique identifier for the user's session, typically stored in a cookie.

User Data: Information such as user ID, authentication status, and user-specific settings.

Session Expiry: Determines how long the session is valid before it needs to be re-established, either through user activity or predefined timeouts.

The browser context datastore 406 includes information about the state and environment of the user's browser during their interaction with the web application. In a specific implementation, the CAPTCHA reloader handles the following browser context: window size and position (e.g., the dimensions and location of the browser window, which can be used to ensure a consistent user experience), browser history (e.g., a record of the pages the user has visited within the application), active tabs (e.g., information about open tabs and their states, which is crucial for maintaining continuity in multi-tab applications), and local and session storage (e.g., Web storage mechanisms for storing data on the client side that persists beyond the current session), to name several examples.

The reloader counter datastore 408 maintains data associated with loading/reloading CAPTCHA. This can be used for debugging, analytics, and optimizing user experience. The reloader counter datastore can include count value (e.g., the number of times the page or component has been reloaded), timestamps (e.g., a record of when each reload occurred), and conditions (e.g., criteria that trigger the reload counter, such as user actions, errors, or updates), to name a few examples.

The CAPTCHA loading subengine 204 integrates these components to manage the state and behavior of the web application effectively. For example, when a user logs in, the session details and cookies are updated to reflect the authenticated state. The browser context ensures that user preferences, such as theme or layout settings, are preserved across sessions. The reloader counter can be used to detect issues if a page is being reloaded frequently, allowing developers to investigate and optimize performance.

The CAPTCHA datastore includes a CAPTCHA instance generated by the CAPTCHA generator, such as the CAPTCHA generator 202 of FIG. 2, and its solution (e.g., answer). The CAPTCHA server datastore 206 may be considered logically part of the CAPTCHA datastore regardless of architecture. A distinction should be drawn between CAPTCHA instances that are generated and stored for a short time and data that is maintained for a longer period, as is discussed below. To the extent it is desirable to draw the distinction explicitly, reference may be made to a short-term CAPTCHA instance datastore, which, in a specific implementation, is maintained only for the duration of a session (or less) and not retained afterward, and the CAPTCHA server engine 104 can be referred to as a CAPTCHA instance server.

In a specific implementation, the generated CAPTCHA instance will not be stored internally (i.e., there is no "CAPTCHA image datastore"); rather, only a valid image's knowledge is stored as a weighted graph inside the structured knowledge graph 120. Similarly, the sentence is also not stored internally; rather, only the knowledge of the valid sentence is stored as a weighted graph inside the knowledge graph. The generated image is disposed once it is delivered to the corresponding endpoint; thus, CAPTCHA instances are forgotten by the system immediately after use.

The Sentence composer 106 is intended to represent an engine that processes through a prompt, e.g. fictitious phrases, from a prompt domain selector, discussed below, whenever a CAPTCHA is generated. The sentence composer generates one or more sentences based on the template provided by the CAPTCHA Generator of the CAPTCHA server engine 104.

Figure 5:
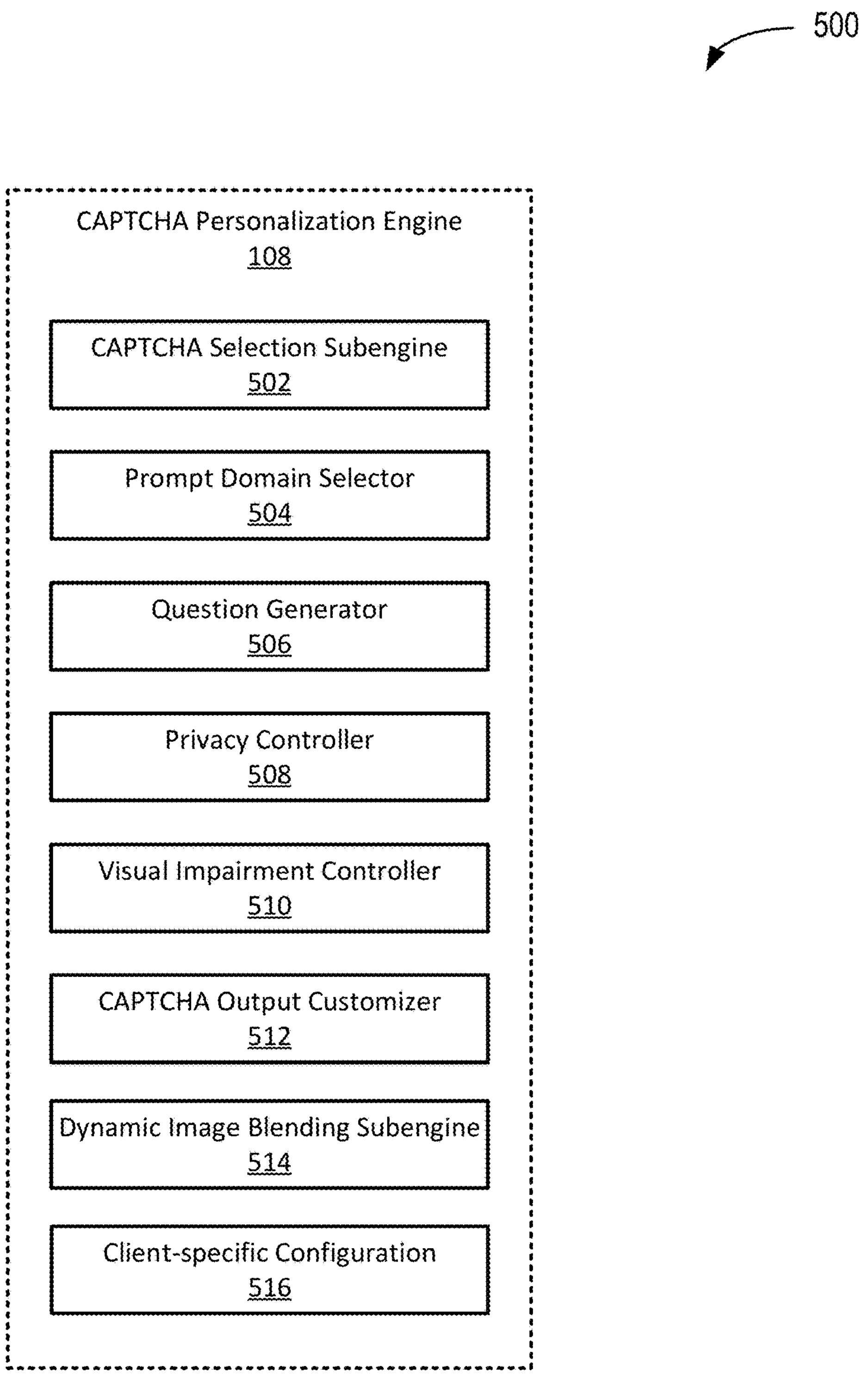
FIG. 5 depicts an example of a CAPTCHA personalization engine.

FIG. 5 depicts an example of a CAPTCHA personalization engine (CAPE), such as the CAPE 108 of FIG. 1. FIG. 5 includes a CAPTCHA selection subengine 502, a prompt domain selector 504, a question generator 506, a privacy controller 508, a visual impairment controller 510, a CAPTCHA output customizer 512, a dynamic image blending subengine 514, and a client-specific configuration subengine 516.

The CAPE helps an admin (a human or artificial agent, such as an automated script) to control the CAPTCHA image generation process by modifying parameters associated with: (i) a CAPTCHA selection engine; (ii) a prompt domain selector; (iii) a question generator; (iv) a privacy controller; (v) a visual impairment controller; (vi) a CAPTCHA output customizer; (vii) a dynamic image blending controller; and (viii) a client-specific configuration.

Figure 6:
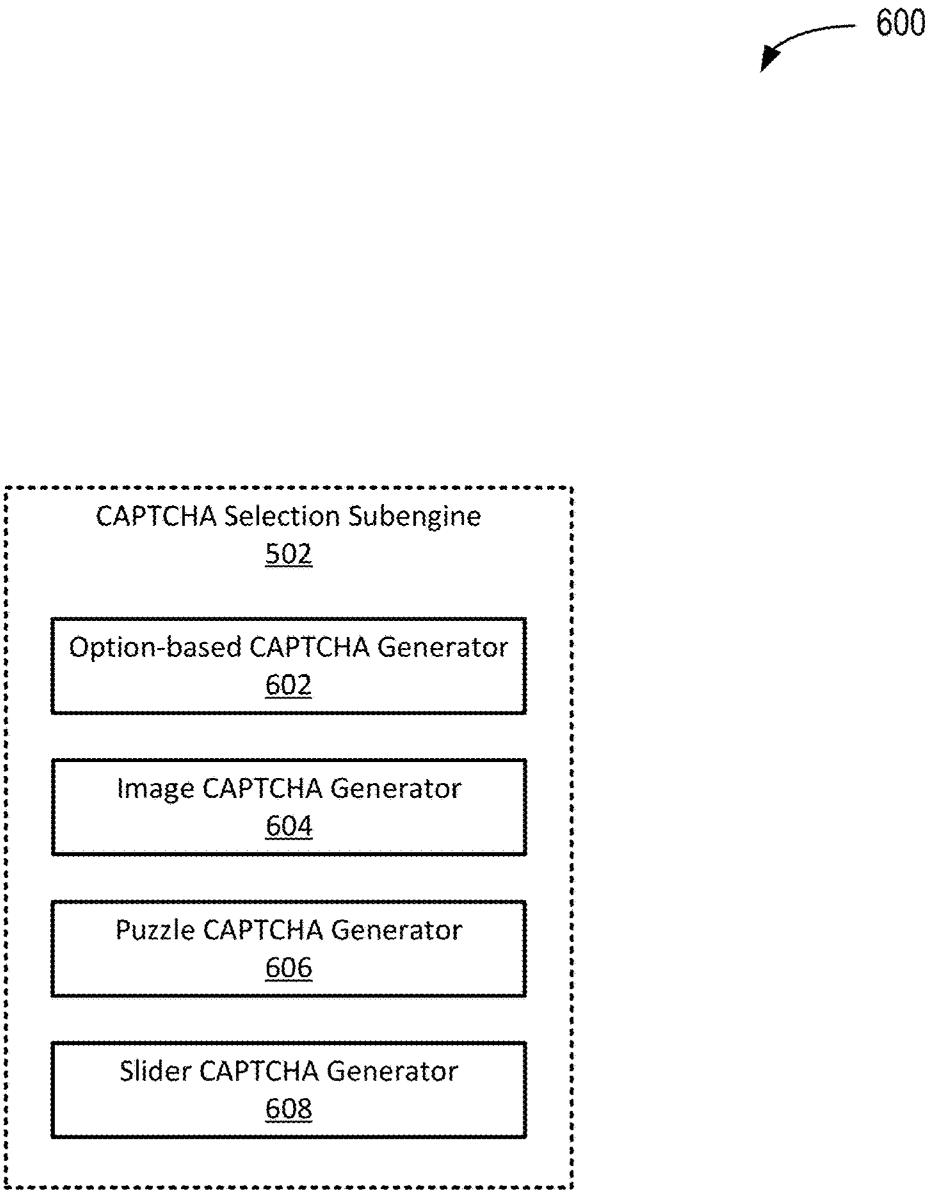
FIG. 6 depicts an example of a CAPTCHA selection engine.

FIG. 6 depicts an example of a CAPTCHA selection engine, which includes the CAPTCHA selection subengine 502, an option-based CAPTCHA generator 602, an image CAPTCHA generator 604, a puzzle CAPTCHA generator 606, and a slider CAPTCHA generator 608. The type of CAPTCHA to be employed is customizable, and it is selected by admin through the CAPTCHA selection engine 502. The kinds of CAPTCHA provided above by way of example provide the following.

Option-based CAPTCHA—The option-based CAPTCHA generator 602 provides a CAPTCHA instance that asks the user to select from given options by mapping displayed images.

Image Identification CAPTCHA—The image CAPTCHA generator 604 provides a CAPTCHA instance that challenges the user to recognize a subset of images within a set of images. For example, the user may be challenged to identify all the images with trees.

Puzzle CAPTCHA—The puzzle CAPTCHA generator 606 provides a CAPTCHA instance that challenges the user to prove they are Not a Robot; in one example, it asks to drag a missing piece to make the puzzle piece coincide with the main picture.

Slider CAPTCHA—The slider CAPTCHA generator 608 provides a CAPTCHA instance that challenges the user to prove they are Not a Robot; in one example, it asks to drag the slider to make the puzzle piece coincide with the main picture.

Figure 13:
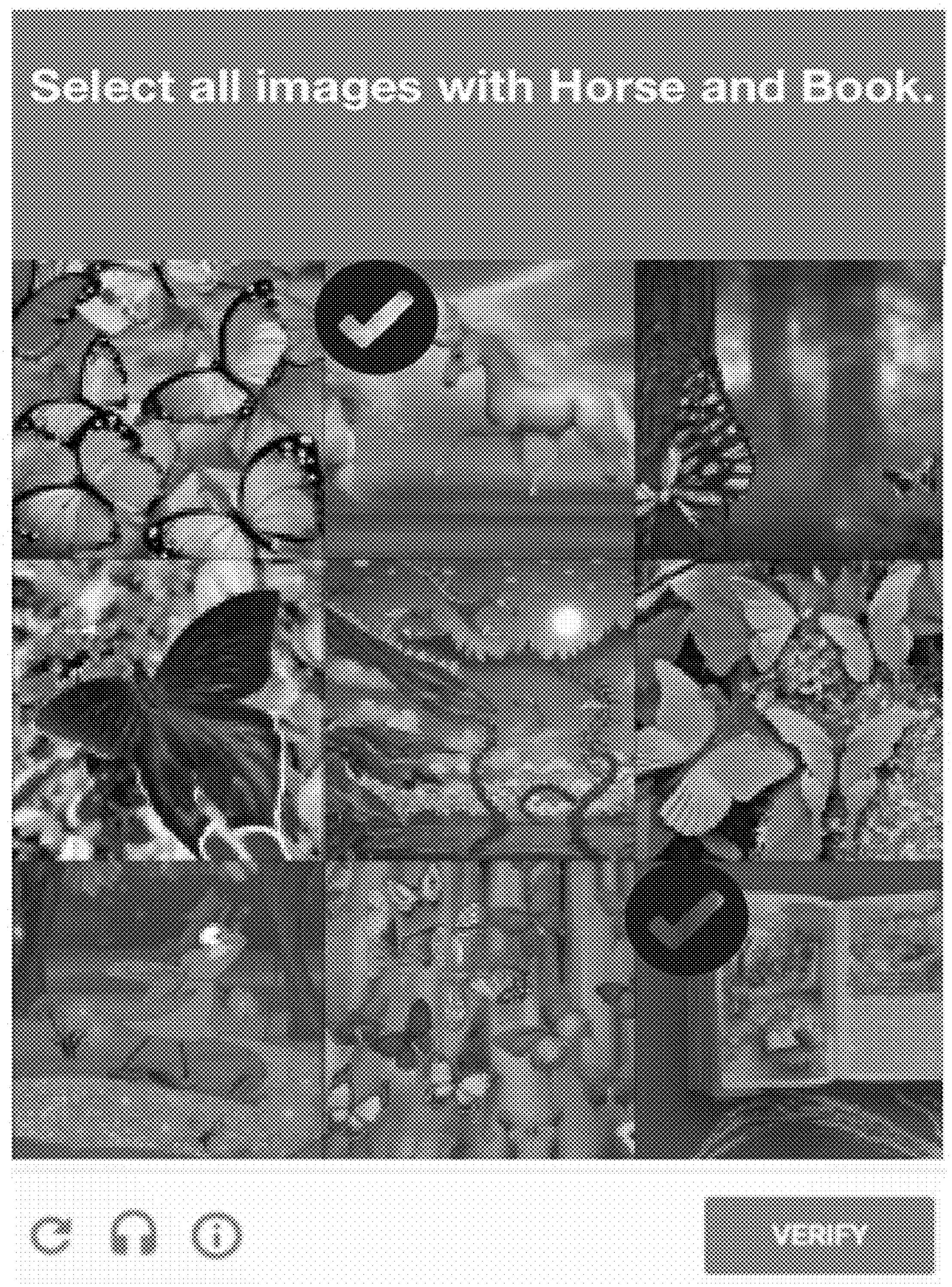
FIG. 13 depicts an example of a CAPTCHA generated using image diffusion with a first question, showing correct answers with a check mark.

For instance, if the admin selects Image identification CAPTCHA, then the CAPTCHA instance would require nine images as shown in FIG. 13. The CAPTCHA selection engine provides a template for the preferred image identification CAPTCHA to CAPTCHA Generator.

In a specific implementation, the prompt domain selector 504 is intended to represent an engine that helps to control a sentence crawler (present within a sentence composer, such as the sentence composer 106 of FIG. 1), by specifying the conditions like kind of characters to include in sentences (e.g. Horse, Cat, Hulk, etc.), domains (e.g., Space, Chemistry, etc.); environmental conditions (e.g., Winter, Summer, etc.), to name a few examples. This helps to control the sentence created by sentence composer.

In a specific implementation, the question generator 506 is intended to represent an engine that generates multiple, unique questions from a structured knowledge graph, such as the structured knowledge graph 120 of FIG. 1, and image generated by an image composer, such as the image composer 114 of FIG. 1. The question generator can generate multi-modal questions by considering various aspects of the sentence parts like intent, connecting phrases, antonyms, and other semantically correlated phrases. This results in the generation of one or more questions dynamically based on, e.g., the intent, connecting phrases, and antonyms extracted from the phrase or sentence using LLM. These questions are helpful in reusing the same set of CAPTCHA (but not CAPTCHA instances) across multiple numbers of users/endpoints with different questions and answers.

In a specific implementation, the privacy controller 508 is intended to represent an engine that controls privacy policy based on a custom (e.g., domain-specific) dictionary to create a valid sentence that complies with the privacy policy (e.g., GDPR). For example, when a sentence violates policy, the privacy controller automatically initiates a fix by generating a sentence dynamically based on the system's (prelearned) structured knowledge graph.

In a specific implementation, the visual impairment controller 510 is intended to represent an engine that helps the admin to control the difficulty level of CAPTCHA, e.g., to control whether to use an NST model during CAPTCHA generation.

In a specific implementation, the CAPTCHA output customizer 512 is intended to represent an engine that enables a user to adjust CAPTCHA output in accordance with preferences, to the extent preferences are allowed. For example, the user could request CAPTCHA for those with a particular visual impairment (and the system may or may not also have a visual impairment controller), that does not include certain things, such as spiders if the user has arachnophobia, or the like.

In a specific implementation, the dynamic image blending engine 514 is intended to represent an engine that provides a generic model to which a generated image is added with noise or processed with other neural transfer mechanisms. Image noise is a random variation of brightness or color information in the image. Images containing multiplicative noise have the characteristic that the brighter the area, the noisier it is.

Figure 7:
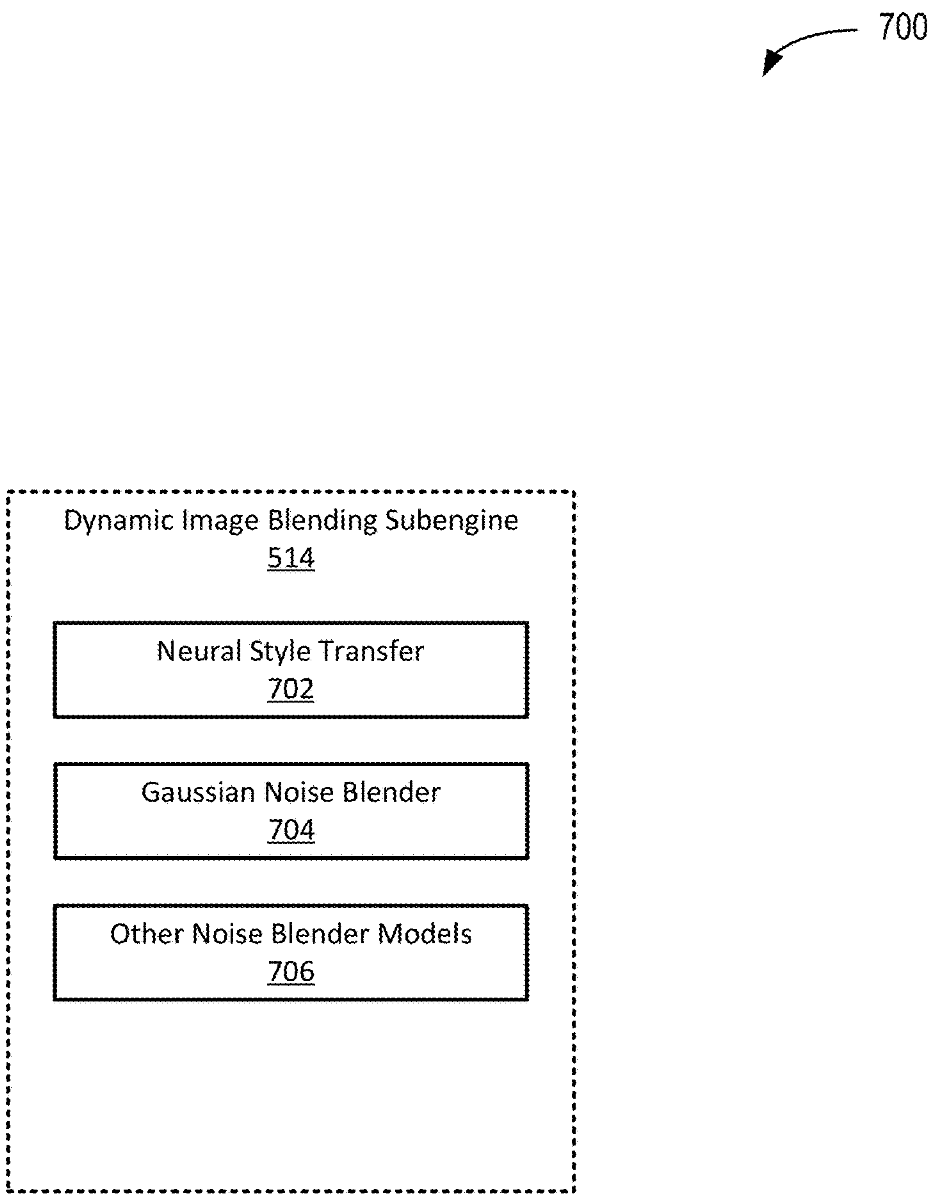
FIG. 7 depicts an example of a dynamic image blending engine.
Figure 14:
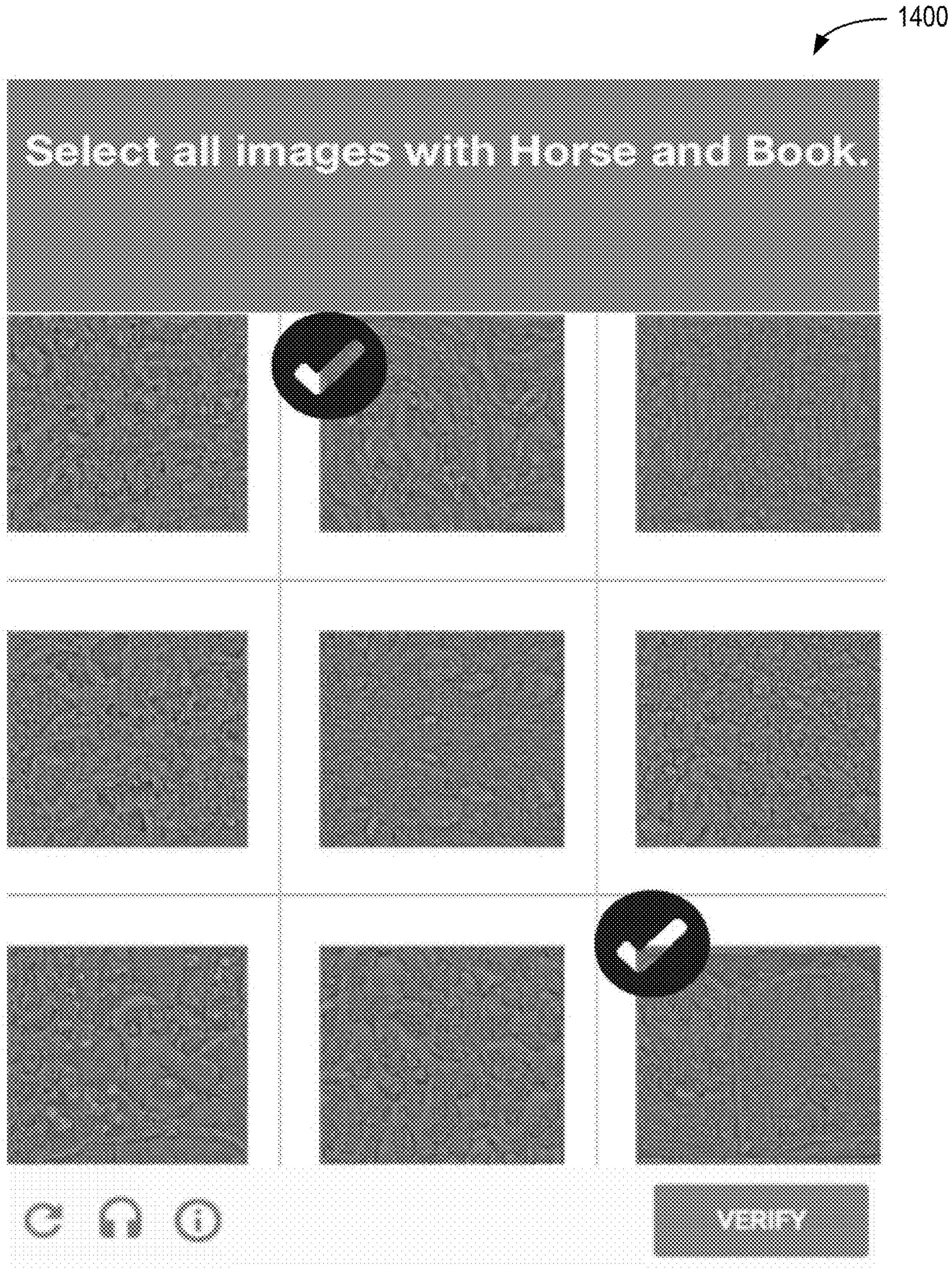
FIG. 14 depicts an example of a CAPTCHA generated using neural style transfer (NST) with a first question, showing correct answers with a check mark.
Figure 16:
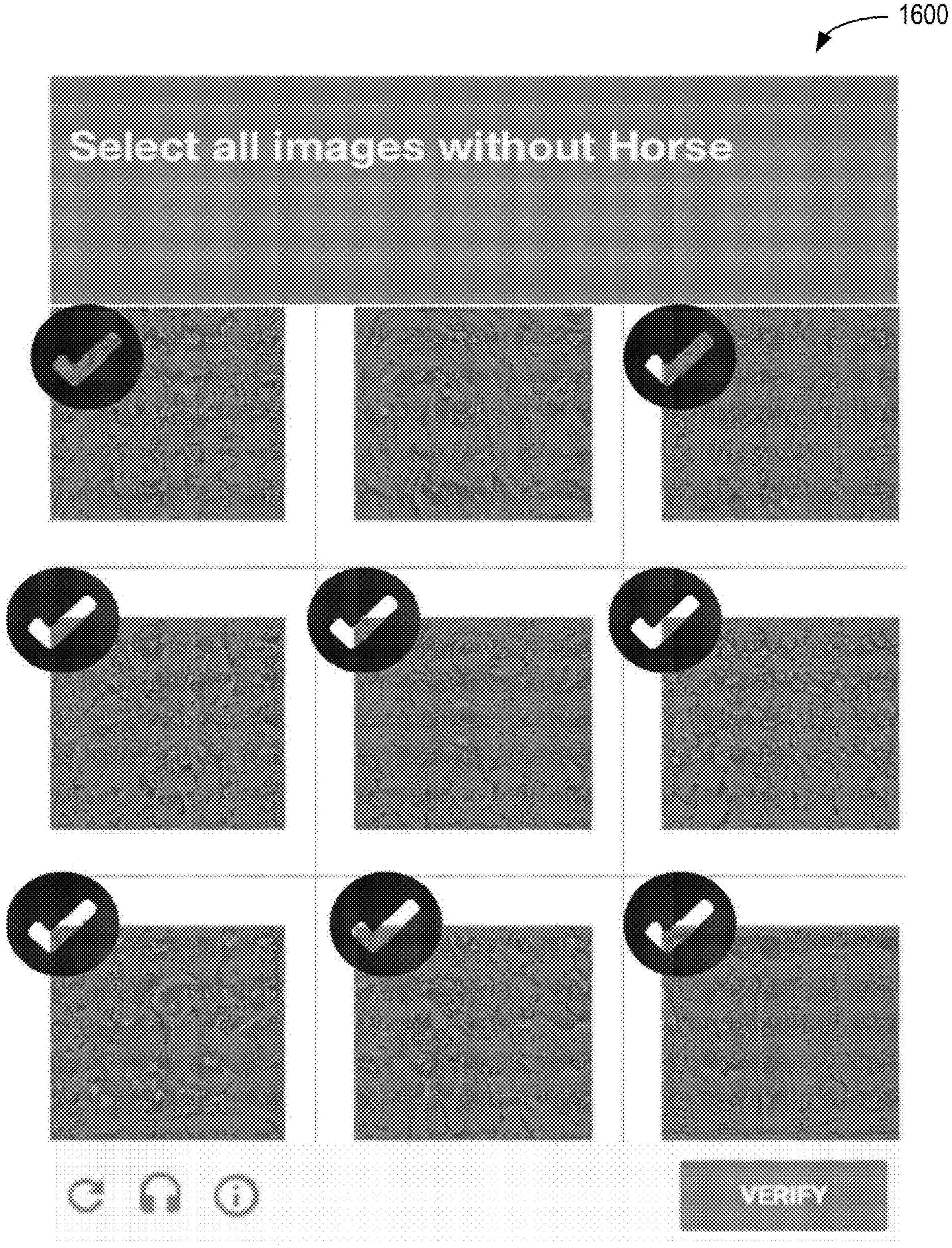
FIG. 16 depicts an example of a CAPTCHA generated using NST with a second question, showing correct answers with a check mark.
Figure 18:
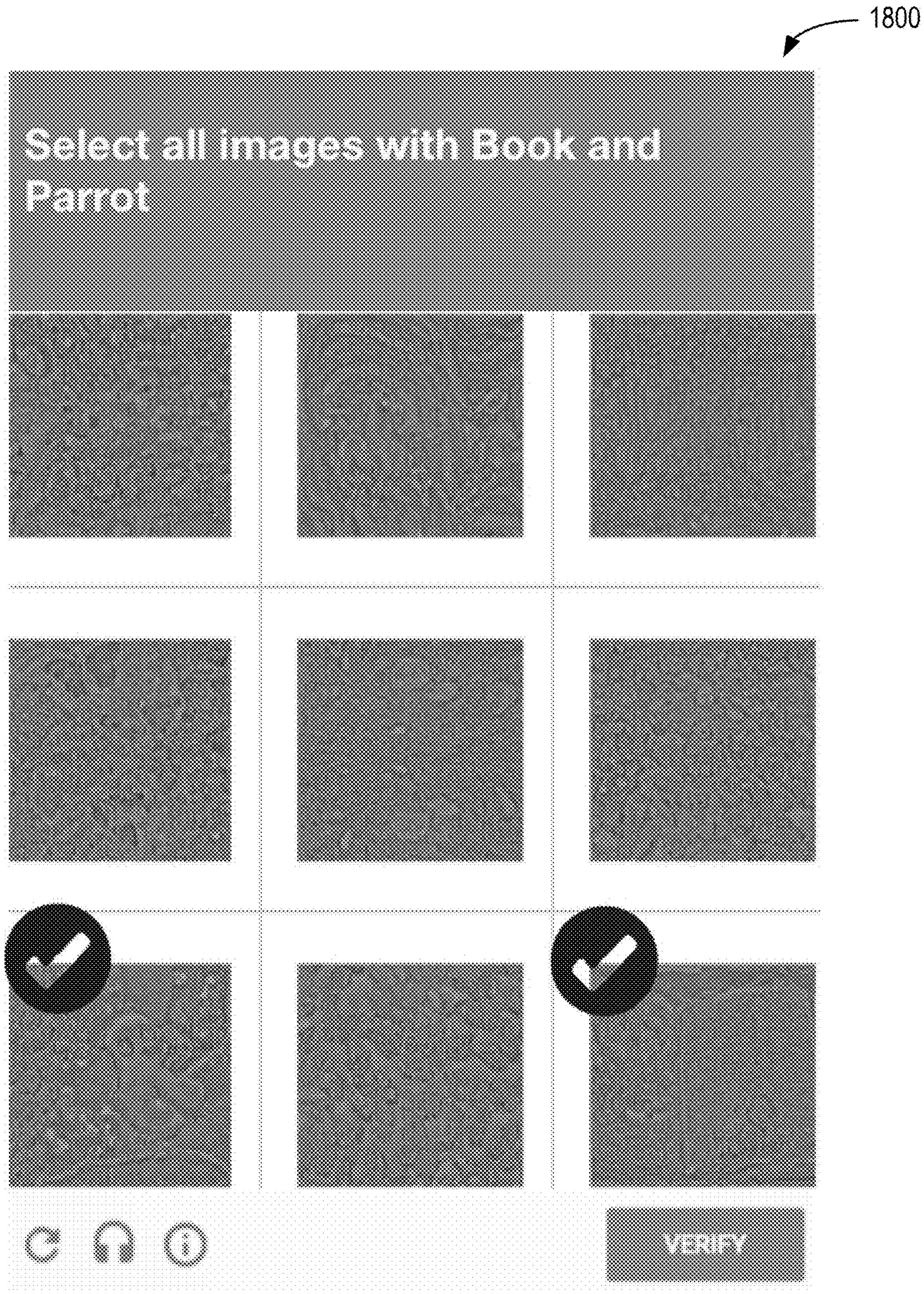
FIG. 18 depicts an example of a CAPTCHA generated using NST with a third question, showing correct answers with a check mark.

FIG. 7 depicts an example of a dynamic image blending engine, depicting the dynamic image blending subengine 514, Neural Style Transfer (NST) 702, Gaussian noise blender 704, and other noise blender models 706. Neural Style Transfer (NST) is a technique of blending style from one image into another image, keeping its content intact. The NST embeds style configurations of the image to the content image, thereby it becomes hard for a bot to recognize the content. FIGS. 14, 16, and 18. The content image describes the layout, or the sketch and Style is the painting or the colors. It is an application of computer vision related to image processing techniques and deep Convolutional Neural Networks (CNN). Dynamically customizing the style transfer process of the NST mechanism during CAPTCHA image generation is possible.

The simplest noise is Gaussian noise, which is a statistical noise having a probability density function equal to the normal distribution, also known as Gaussian distribution. Random Gaussian function is added to the image to generate this noise. In alternative implementations, other noise blender models can be used.

Figure 15:
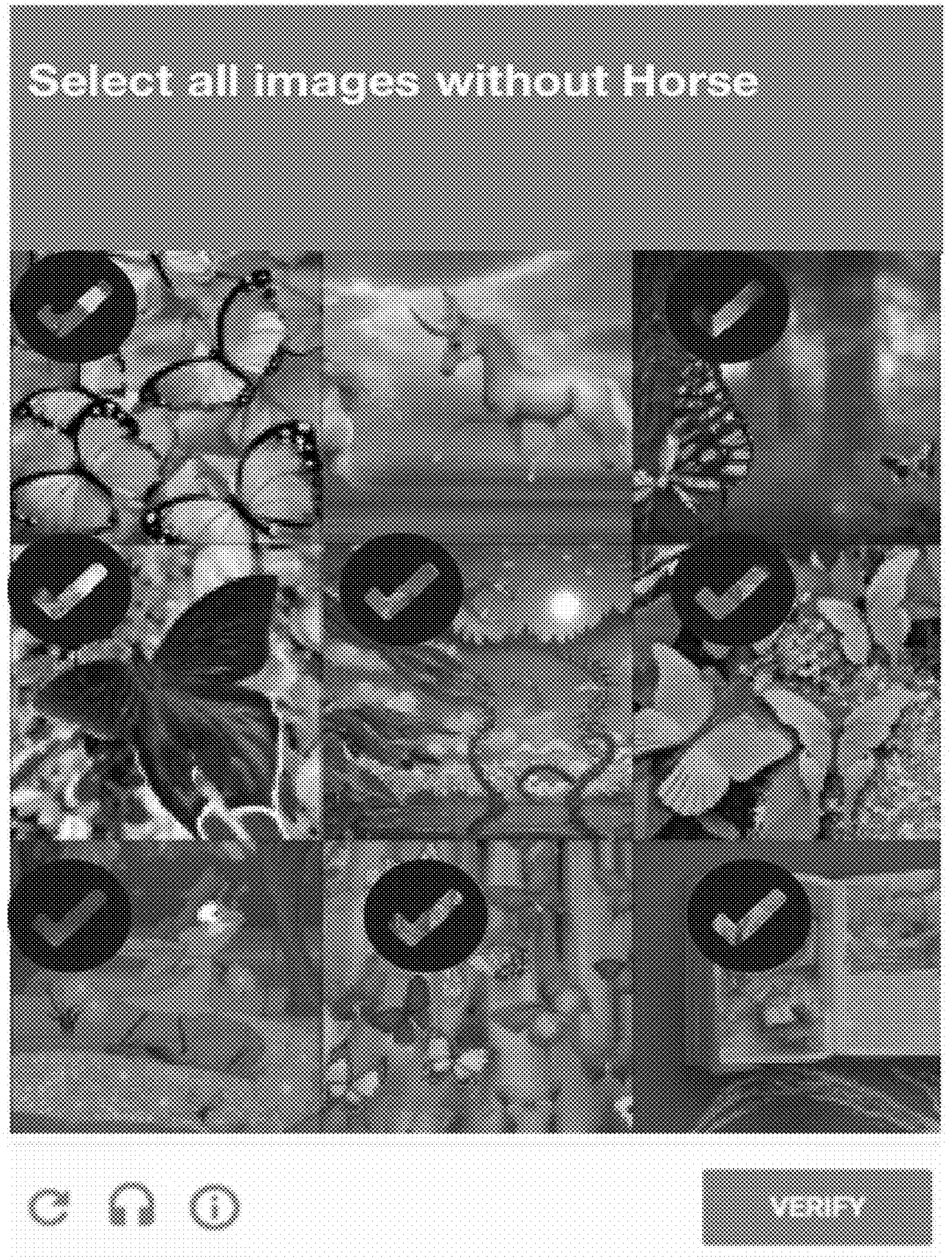
FIG. 15 depicts an example of a CAPTCHA generated using image diffusion with a second question, showing correct answers with a check mark.
Figure 17:
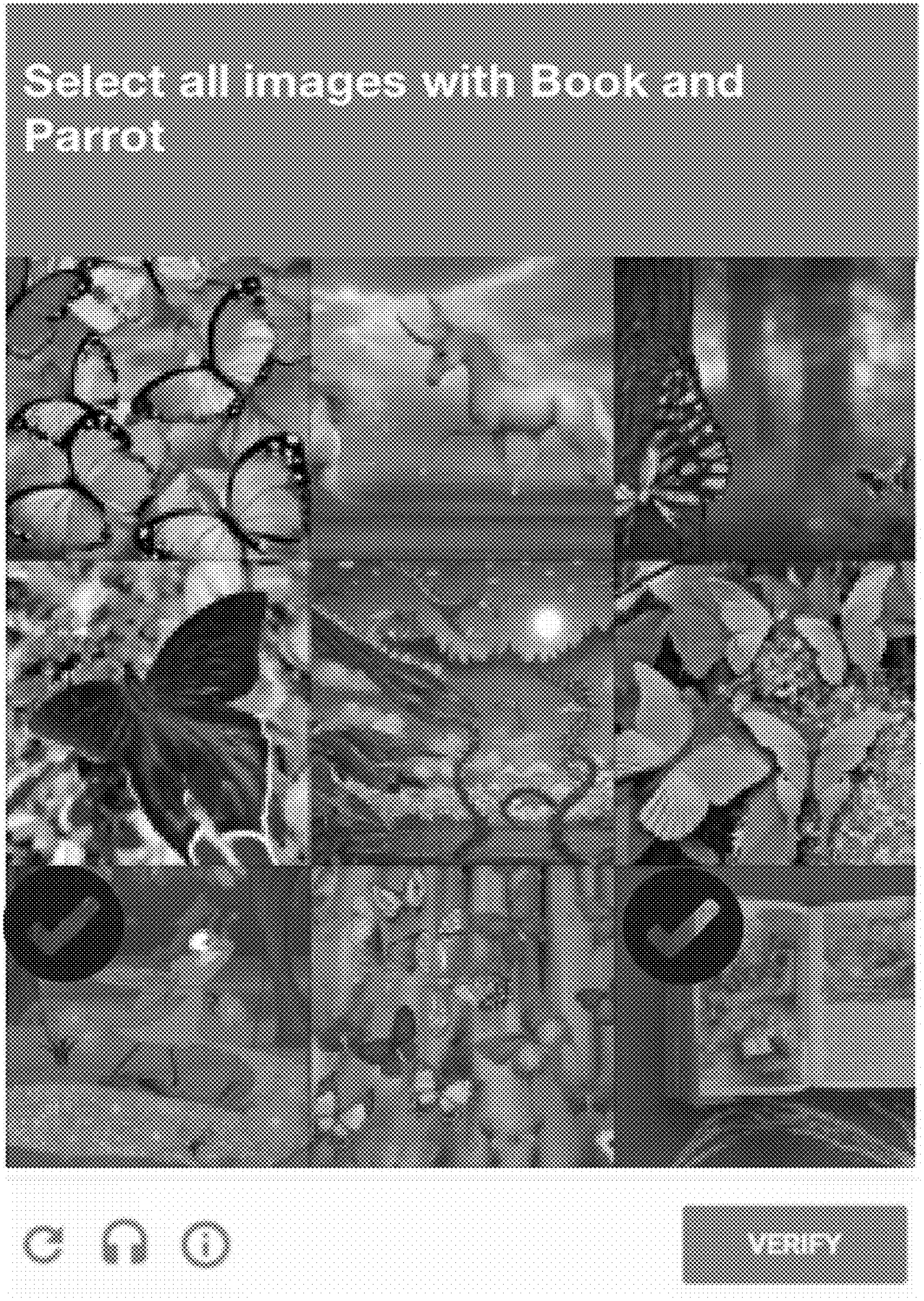
FIG. 17 depicts an example of a CAPTCHA generated using image diffusion with a third question, showing correct answers with a check mark.

The image generated by an image composer, such as the image composer 114 of FIG. 1, is used to generate a CAPTCHA instance that can be displayed to the user for secure login. Sample images are shown in FIGS. 13, 15, and 17. To protect the CAPTCHA from brute-force attack, the system may use NST to protect the CAPTCHA by blending a style image to the content image thereby making it unmanageable to identify by a non-human entity.

Figure 8:
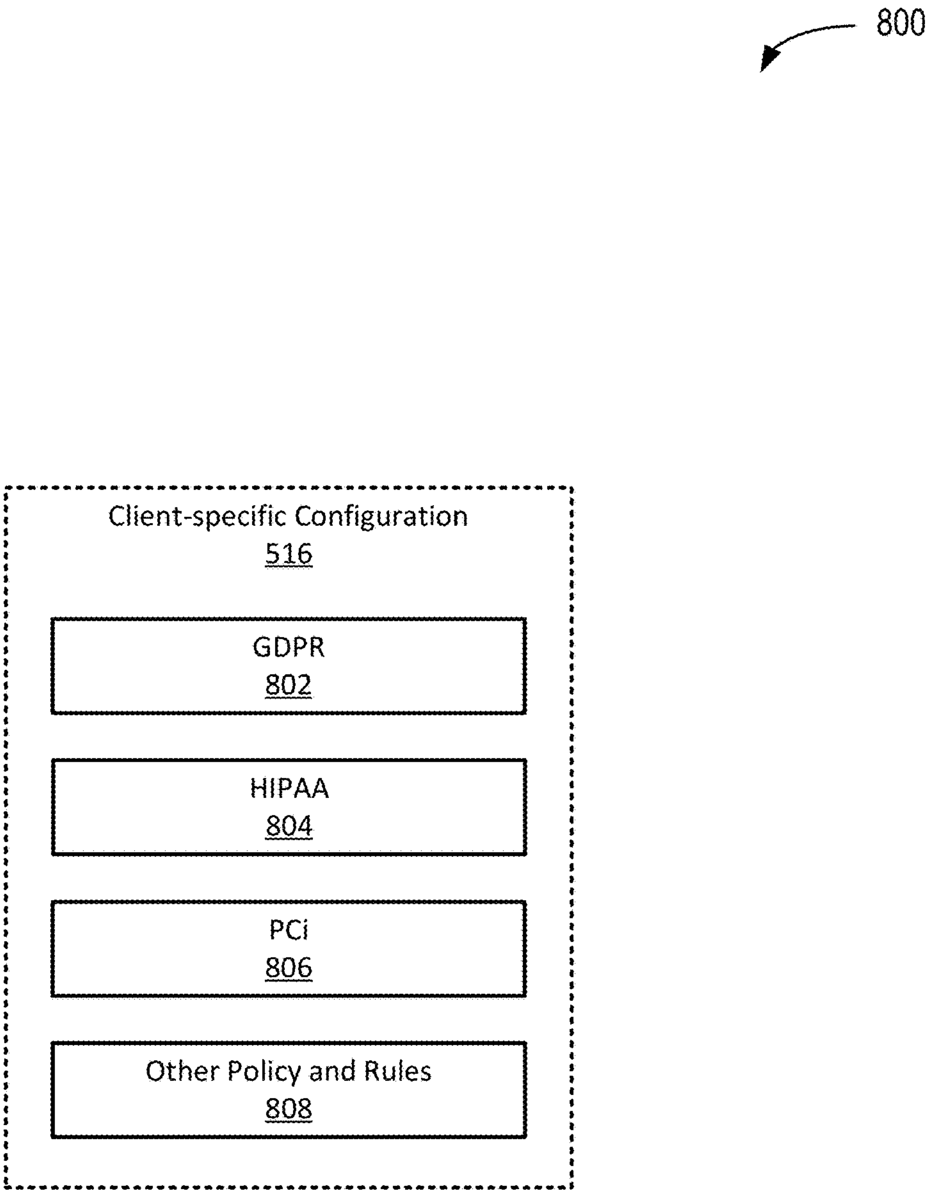
FIG. 8 depicts an example of a client-specific configuration engine.

FIG. 8 depicts an example of a client-specific configuration engine, depicting the client-specific configuration engine 516, General Data Protection Regulation (GDPR) module 802, Health Insurance Portability and Accountability Act (HIPAA) module 804, Protected Health information (PHi) module 806, and other policy and rules module 808.

GDPR is a regulation in EU law effective since May 25, 2018, aimed at protecting the personal data and privacy of individuals within the European Union and the European Economic Area. It applies to any company processing and holding personal data of individuals residing in the EU, regardless of the company's location. HIPAA is a U.S. law enacted in 1996 that sets the standard for protecting sensitive patient data. Any organization that deals with PHi must ensure that all the required physical, network, and process security measures are in place and followed. An example of another policy and rules module is one that addresses Payment Card Industry Data Security Standard (PCI DSS) issues. PCI DSS is a set of security standards designed to ensure that all companies that accept, process, store, or transmit credit card information maintain a secure environment. These regulations and standards may be crucial for protecting sensitive data and ensuring privacy and security across different sectors and regions.

In a specific implementation, the client-specific configuration subengine 516 is intended to represent an engine that allows a client to configure specific GDPR, HIPAA, PCI, or other policies according to their standards. A prompt generator generates a prompt which complies with the policies and standards of the client. For example, policy may include validating an image for copyright-free images or other copyright infringement issues.

Figure 9:
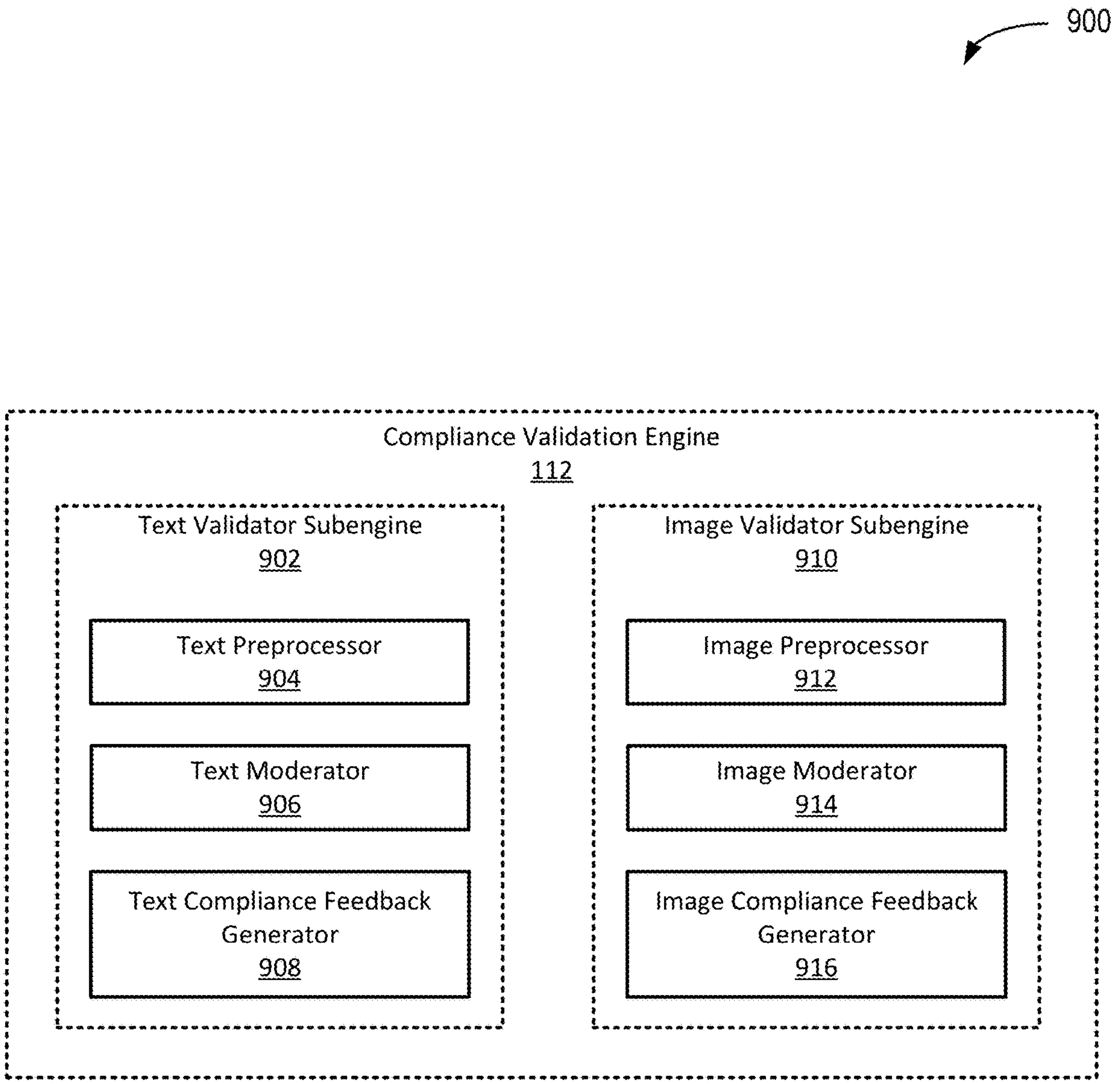
FIG. 9 depicts an example of a compliance validation engine.

FIG. 9 depicts an example of a compliance validation engine, depicting the compliance validation engine 112, a text validator subengine 902, and an image validator subengine 910. In the example of FIG. 9, the text validator subengine 902 includes a text preprocessor 904, a text moderator 906, and a text compliance feedback generator 908 and the image validator subengine 910 includes an image preprocessor 912, an image moderator 914, and an image compliance feedback generator 916.

In a specific implementation, the text validator subengine 902 is intended to represent an engine that validates the sentence generated by the sentence composer by defining a boundary condition based on the GDPR or other standard policies. If the sentence is compliant, the sentence is input to the image composer 114 and the graph composer 116. If the sentence is not valid, the invalid sentence is input to the compliance feedback processor 118.

In a specific implementation, the image validator subengine 910 includes a trained Machine Learning (ML) model. The image preprocessor 912 pre-processes the image. The ML model dynamically analyzes images for features like the background images (a.k.a. style images) are represented with light colors, so that it will not overlap with the intent (a.k.a. the content) images properties; validating whether the Image follows the privacy control like GDPR etc.; validating whether the Image is free from sensitive information. In the case of Image CAPTCHA, the output may be configured to have, e.g., 9 individual images. In that case, the engine validates whether the number of images generated are equivalent to 9 or more; else, the engine will follow a feedback model requesting new images until the engine gets the appropriate number of output images.

The image moderator 914 compares the pre-processed image with policy as described by the CAPE. For example, if the POLICY is "Generated Image should be free from religious content" and/or if another rule is "The generated Image should not contain religious symbols and colors."

If the generated image is valid and compliant with the policy, then the image is made available to the CAPTCHA generator of the CAPTCHA server engine 104. If the image is not valid, e.g., non-compliant, then the image compliance feedback generator 916 generates feedback that is made available to the compliance feedback processor 118.

This model enables the system to dynamically compose with various open source or proprietary text-to-image generator tools. The Pre-Trained Text-to-Image AI model represents the tools that use AI technology to create or generate new images by learning patterns from existing data and is commonly known as an AI image generator. Other technical names for such an image generator are AI-powered image synthesis tools or Generative adversarial networks (GAN). For example: Dall-E 2, Imagen, Stability AI, Midjourney, etc. The image composer 114 creates one or more policy compliant images as determined by the CAPTCHA generator.

Figure 10:
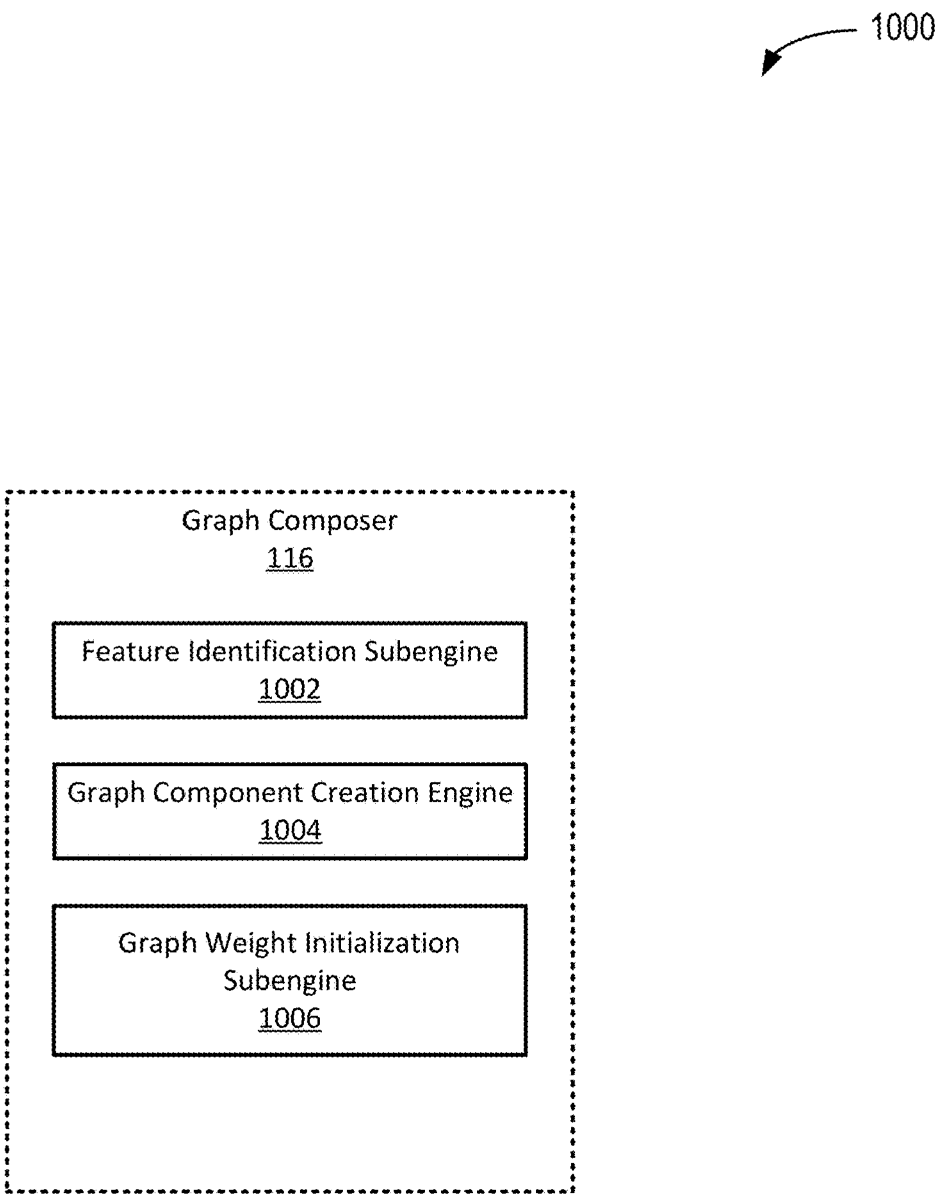
FIG. 10 depicts an example of a graph composer engine.

FIG. 10 depicts an example of a graph composer engine, depicting the graph composer engine 116, a feature identifier subengine 1002, a graph component creation subengine 1004, and a graph weight initialization subengine 1006. In the context of Natural Language Processing (NLP) and image modeling, the graph composer engine is intended to represent and engine that provides a tool or framework that integrates graph-based representations for generating and organizing textual and visual content. It leverages graph structures where nodes represent entities (such as words, phrases, or objects) and edges denote relationships (like semantic connections or dependencies).

For NLP tasks, the graph composer utilizes these structures to model and generate coherent text. It may employ techniques like graph traversal algorithms to construct meaningful sentences or paragraphs based on the relationships between words or concepts. This approach helps in maintaining context and coherence, especially in tasks like text summarization or dialogue generation. Also, the graph composer applies similar principles to represent and manipulate visual content. Here, nodes can represent objects or regions within an image, while edges capture spatial relationships or contextual dependencies. By integrating these graph-based representations with image processing techniques, the graph composer can generate or modify images based on semantic content or stylistic criteria. The graph composer serves as a powerful tool for synthesizing and structuring textual and visual information using graph-based representations, enhancing both understanding and generation capabilities in AI systems, particularly in NLP and image modeling contexts.

The graph component creation subengine 1004 creates structures for knowledge of valid images and valid sentences because the images and sentences are not stored internally, only the knowledge associated with them is. The graph weight initialization subengine 1006 facilitates storing valid image and sentence knowledge as a weighted graph inside the structured knowledge graph 120.

Figure 11:
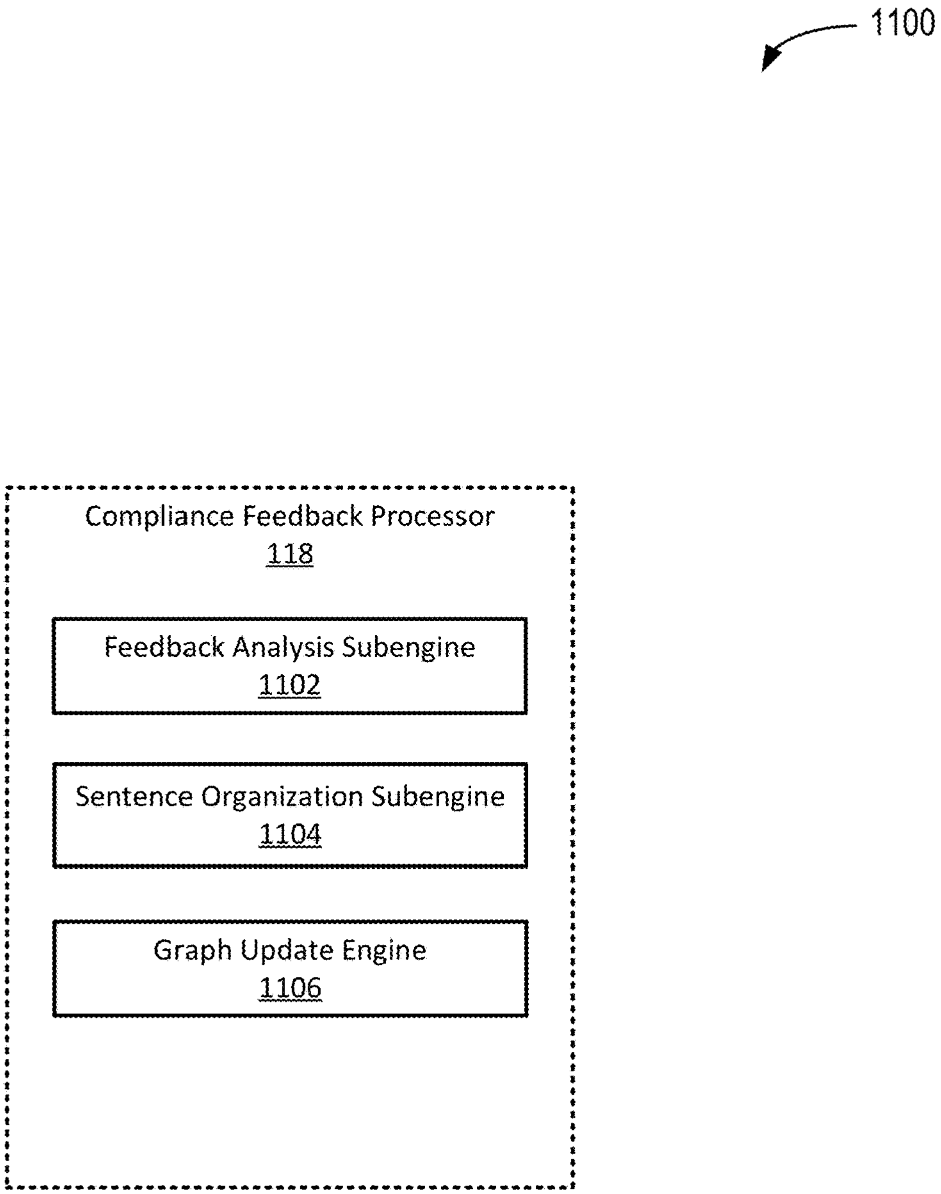
FIG. 11 depicts an example of a compliance feedback processor engine.

FIG. 11 depicts an example of a Compliance Feedback Processor (CFP) engine, depicting the CFP engine 118, a feedback analysis subengine 1102, a sentence organization subengine 1104, and a graph update subengine 1106. The CFP engine 118 is intended to represent an engine configured to gather, analyze, and respond to feedback concerning adherence to regulations, standards, and internal policies. It begins with collecting feedback from various sources such as image composer, sentence composer, policy audits, and regulatory bodies mapping with image analysis reports, and compliance analysis. This feedback is then aggregated into a central repository, where the feedback analysis subengine 1102 identifies patterns, trends, and areas of non-compliance. The results are summarized in reports by the feedback analyzer, highlighting key compliance issues and suggesting negative words that may need improvement. Action plans are developed to address these issues, assigning responsibilities and setting timelines for corrective measures. The implementation of these actions is monitored continuously to ensure effectiveness and ongoing compliance. A feedback loop reassesses and refines the CFP based on new data and changing regulatory requirements, potentially fostering a culture of continuous improvement in compliance efforts.

Invalid images are analyzed through a compliance feedback process using traditional image processing techniques without the application of machine learning algorithms. The process begins with pre-processing steps such as resizing, normalization, and noise reduction to ensure consistency across all images. Key features of the images are then extracted using methods like edge detection, color histogram analysis, and texture analysis. Edge detection techniques, such as the Canny or Sobel methods, help identify the boundaries of objects within the image, which is useful for determining if the image content adheres to guidelines. Color histogram analysis is used to evaluate the distribution of colors within the image, ensuring that it meets specific color-related criteria. Texture analysis can be employed to examine the surface properties of objects in the image, ensuring they match the expected texture patterns. Once these features are extracted, the images are compared against predefined compliance rules and thresholds. For example, if an image's color distribution significantly deviates from the acceptable range, it is flagged as invalid. Similarly, if edge detection reveals inappropriate shapes or objects that do not conform to the guidelines, the image is marked for non-compliance. The compliance feedback process then documents the reasons for invalidation, which can be used to refine the image processing criteria and improve future analysis. This systematic approach ensures that images are thoroughly evaluated and that non-compliant images are accurately identified and addressed.

The sentence organization subengine 1104 is intended to represent an engine that utilizes graph-based models to enhance the coherence and structure of text in the context of NLP. In a specific implementation, these models represent the relationships between words, phrases, or sentences as nodes and edges in a graph, capturing the syntactic and semantic connections that dictate how elements of text should be ordered. For instance, dependency parsing is a common technique where sentences are analyzed to understand the grammatical relationships between words, forming dependency trees.

Each word in a sentence is a node, and directed edges connect words based on their grammatical dependencies, such as subject-verb or adjective-noun relationships. These dependency trees help in identifying the hierarchical structure of sentences, allowing the sentence organizer to reorder them logically. Additionally, semantic graphs can be employed to capture the meanings and thematic connections between different parts of the text. By leveraging both syntactic and semantic information, graph-based models can effectively arrange sentences or words, ensuring that the final output is coherent and contextually appropriate.

The Graph Update (GU) subengine 1106 is intended to represent an engine configured to dynamically modify graph structures to reflect changes in the textual data being processed in an NLP context. The GU is particularly useful in graph-based models where the relationships between words, phrases, or sentences are represented as nodes and edges. In a specific implementation, the GU allows the model to iteratively update the graph to better capture the evolving context and dependencies within the text. For instance, in tasks like text generation or summarization, the GU can adjust the weights of edges or add/remove nodes based on new information, ensuring that the graph remains an accurate representation of the text's structure and meaning. By continuously refining the graph, the GU helps maintain a coherent and logical sequence in the generated text. This dynamic updating mechanism is useful for models that need to handle complex and changing inputs, providing a robust framework for understanding and generating natural language.

The structured knowledge graph 120 is intended to represent information using a graph format, where entities (nodes) and their relationships (edges) are clearly defined. It employs graphs to store, query, and visualize data, emphasizing the interconnections between data points. Entities, or nodes, represent objects or concepts in the graph and typically have unique identifiers along with various attributes or properties. For instance, in a knowledge graph about images, nodes could represent an image, color, character, background, etc., the relationships, or edges, denote the connections or interactions between these various nodes, providing a comprehensive and interconnected view of the data. This structure allows for efficient querying and retrieval of information, making the structured knowledge graph a powerful tool for data analysis and understanding complex relationships within a dataset.

Figure 12:
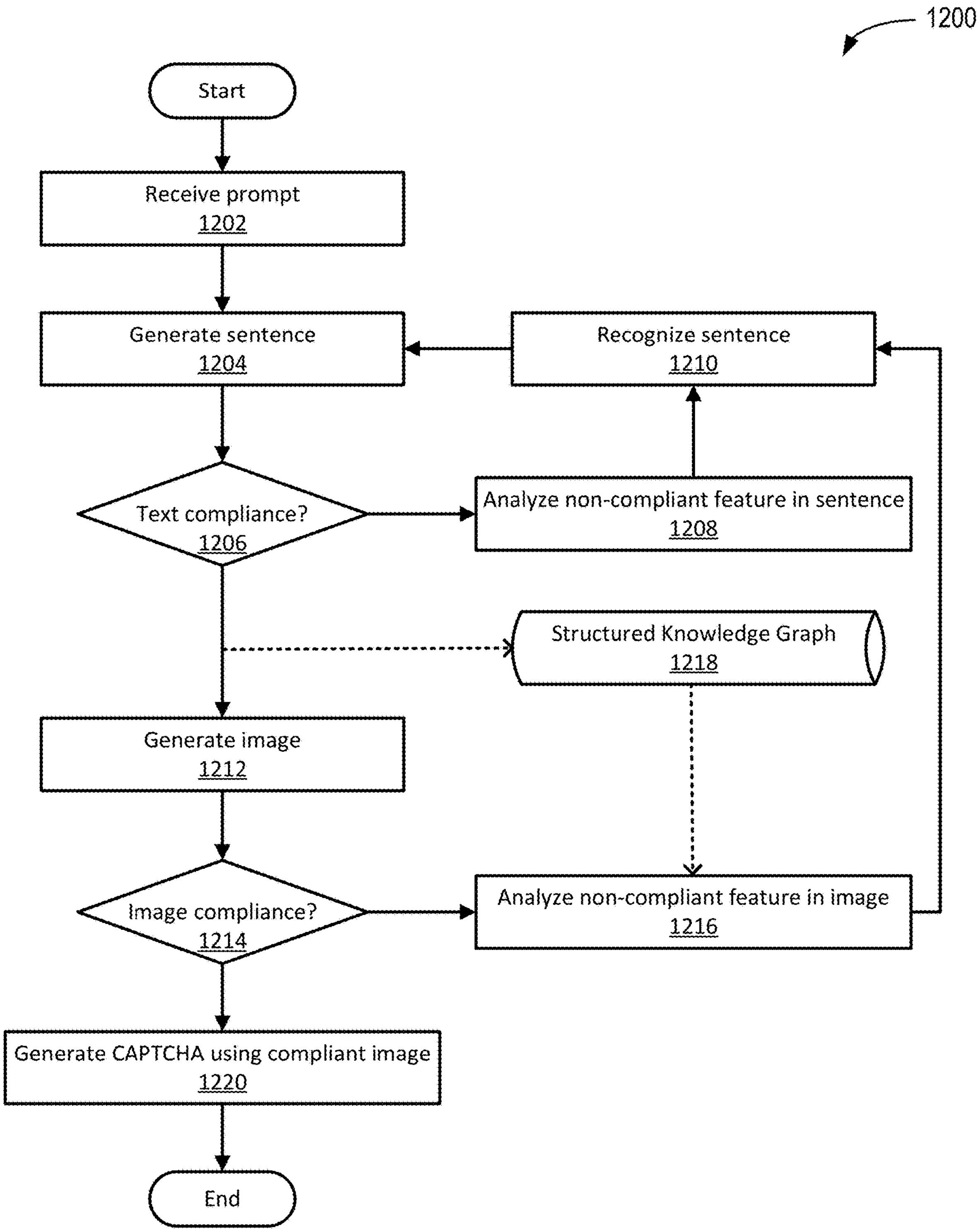
FIG. 12 depicts a flowchart illustrating an example of a method to create an image identification CAPTCHA using a policy compliant CAPTCHA generation system.

FIG. 12 is a flowchart illustrating an example of a method to create an image identification CAPTCHA using a policy compliant CAPTCHA generation system, such as the system illustrated in the example of FIG. 1. A template is generated by a CAPTCHA selection unit, and the template is input to a CAPTCHA image handler, which determines the number of images to be used to form the final CAPTCHA. This information is input to the sentence composer and image composer.

The flowchart starts at module 1202 where a prompt is received to invoke a sentence composer, such as was described above with reference to the sentence composer 106 of FIG. 1. At module 1204, the sentence is generated by the sentence composer. At decision point 1206, when the sentence is input to a text compliance validator, such as was described above with reference to the compliance validation engine 112 of FIG. 1 (see also FIG. 9), the text compliance validator determines whether the text is compliant. The sentence is valid if it is complaint with the privacy policy and other client-specific requirements.

If the sentence is invalid, then the flowchart continues to module 1208 where non-compliant features in the sentence are identified and analyzed by a feedback analyzer in a compliance feedback processor, such as was described above with reference to the compliance feedback processor 118 of FIG. 1 (see also FIG. 11). At module 1210, non-complaint features in the sentence are reorganized by a sentence organizer, such as was described above. The flowchart then returns to module 1204 when the sentence is provided as input to the sentence composer to generate a new sentence; the flowchart then continues to decision point 1206 as described above. The cycle is repeated till a valid sentence is obtained.

If the sentence is valid, then the flowchart continues to module 1212 where features of the valid sentence are extracted by a graph composer, such as was described above with reference to the graph composer 116 of FIG. 1 (see also FIG. 10). A structured knowledge graph, such as was described above with reference to the structured knowledge graph 120, is built from the extracted features (represented in FIG. 12 as a forked dotted line arrow from decision point 1206 to the structured knowledge graph 1218, which is referenced later; see also the structured knowledge graph 120 of FIG. 1). The valid sentence is input to the image composer and an image is generated by an image composer, such as was described above with reference to the image composer 114 of FIG. 1.

The flowchart continues to decision point 1214 where compliance of the image with respect to the privacy policy and other client-specific requirements is checked by an image compliance validator, such as was described above with reference to the compliance validation engine 112 of FIG. 1 (see also FIG. 9).

If the image is invalid, the flowchart continues to module 1216 where non-complaint features in the image are analyzed with respect to the structured knowledge graph 1218. The non-compliant features in the image are identified and analyzed by the feedback analyzer. The flowchart returns to module 1210 where the related non-complaint features in the sentence are reorganized by the sentence organizer, and input to the sentence composer to generate a new sentence at module 1204. The compliance of the new sentence is checked by the text compliance validator at decision point 1206. The cycle is repeated till a valid image is obtained.

If the image is valid, then the valid image is input to a CAPTCHA image handler was described above with reference to the CAPTCHA server engine 104 of FIG. 1 and the CAPTCHA generator 202 of FIG. 2 (see also FIG. 3). At module 1220, the CAPTCHA image handler checks if the appropriate number of images has been generated to form the CAPTCHA, based on the template. If satisfied, then the images are input to a CAPTCHA organizer of the CAPTCHA generator to form a CAPTCHA where the flowchart ends. The CAPTCHA organizer organizes the images into the template to create a CAPTCHA instance; it also includes a question as generated by a question generator, as was described above with reference to the CAP engine 108 of FIG. 1 (see also FIG. 5), into the template. If an invalid sentence or invalid image are continuously obtained for a predetermined number of cycles, the prompt may be updated.

FIG. 13 depicts an example of a CAPTCHA 1300 generated using image diffusion with a first question, showing correct answers with a check mark.

FIG. 14 depicts an example of a CAPTCHA 1400 generated using neural style transfer (NST) with a first question, showing correct answers with a check mark.

FIG. 15 depicts an example of a CAPTCHA 1500 generated using image diffusion with a second question, showing correct answers with a check mark.

FIG. 16 depicts an example of a CAPTCHA 1600 generated using NST with a second question, showing correct answers with a check mark.

FIG. 17 depicts an example of a CAPTCHA 1700 generated using image diffusion with a third question, showing correct answers with a check mark.

FIG. 18 depicts an example of a CAPTCHA 1800 generated using NST with a third question, showing correct answers with a check mark.

What is claimed is:

1. A method comprising:
- receiving a prompt;
- generating a sentence;
- checking for compliance until a valid sentence is generated;
- generating an image using the valid sentence and a structured knowledge graph;
- checking for compliance until a valid image is generated;
- generating a Completely Automated Public Turing test to tell Computers and Humans Apart (CAPTCHA) instance using the valid image.

2. The method of claim 1, comprising generating CAPTCHA images that comply with a privacy policy and client-specific configurations.

3. The method of claim 2, wherein the privacy policy includes a policy selected from a group consisting of General Data Protection Regulation (GDPR), Health Insurance Portability and Accountability Act (HIPAA), Protected Health Information (PHI), Payment Card Industry Data Security Standard (PCI DSS), a region-specific policy, and a combination of these.

4. The method of claim 1, wherein the image is generated by an image composer and the valid image is used by a CAPTCHA generator to generate the CAPTCHA instance, comprising:
- subjecting the image to a compliance feedback process at a compliance feedback processor.

5. The method of claim 1, wherein the sentence is generated by a sentence composer and the sentence is used by an image composer to generate the image, comprising:
- subjecting the sentence to a compliance feedback process at a compliance feedback processor.

6. The method of claim 1, wherein the CAPTCHA instance includes a question generated at a CAPTCHA personalization engine, comprising:
- checking the question for compliance with a privacy policy and client-specific configurations.

7. The method of claim 1, comprising generating the CAPTCHA instance based on a CAPTCHA type selected by an admin.

8. The method of claim 7, comprising:
- deciding the CAPTCHA type based on a user's capability to solve the CAPTCHA, increasing usability of CAPTCHA generation and adoption according to the user's ability to solve the CAPTCHA.

9. The method of claim 7, comprising:
- generating a template at a CAPTCHA selection engine, wherein a type of the template is dependent on the CAPTCHA type;
- providing the template to a CAPTCHA generator to invoke an image composer, sentence composer, and question generator.

10. The method of claim 7, comprising customizing a style transfer process of Neural Style Transfer (NST) during CAPTCHA image generation, wherein style transfer layers are customizable based on client convenience and capability.

11. The method of claim 1, comprising:
- determining privacy or sensitivity aspects of the sentence or the image are non-compliant with policy and client-specific configuration;
- performing a feedback loop pointing out identified reasons for non-compliance;
- requesting a new sentence.

12. The method of claim 1, comprising:
- generating one or more questions dynamically based on the prompt and the structured knowledge graph;
- connecting phrases and antonyms extracted from the valid sentence and the valid image.

13. The method of claim 1, comprising dynamically composing a second sentence if a first sentence is invalid.

14. The method of claim 1, wherein a first image is found non-compliant, comprising:
- rejecting the first image;
- dynamically generating a second image using the structured knowledge graph.

15. The method of claim 1, wherein a first sentence or image is found non-compliant, comprising:
- triggering a feedback loop that updates the structured knowledge graph with differential weights based on a policy.

16. The method of claim 1, wherein CAPTCHA properties are defined based on a type of template, comprising:

automatically generating a template according to a CAPTCHA type and properties.

17. The method of claim 1, further comprising adding a Neural Style Transfer (NST) that includes security components along a pipeline of CAPTCHA generation.

18. The method of claim 1, wherein a CAPTCHA image is dynamically generated from the sentence without using existing datasets of images or annotated images.

19. The method of claim 1, comprising updating the prompt when the valid sentence or the valid image has not been generated for a predetermined number of cycles.

20. A system comprising:

one or more processors; and memory storing instructions that, when executed by the one or more processors, cause the system to perform:

receiving, by a sentence composer, a prompt; generating, by the sentence composer, a sentence;

checking, by a text compliance validator coupled to the sentence composer, for compliance until a valid sentence is generated;

extracting, by a graph composer coupled to the text compliance validator, features of the valid sentence, wherein a structured knowledge graph is built from the extracted features;

generating, by an image composer coupled to the graph composer, an image using the valid sentence and the structured knowledge graph;

checking, by an image compliance validator coupled to the image composer, compliance of the image with respect to a privacy policy until a valid image is generated;

generating, by a Completely Automated Public Turing test to tell Computers and Humans Apart (CAPTCHA) generator coupled to the image compliance validator, a CAPTCHA instance using the valid image.

* * * * *